United States Patent
Zhang et al.

(10) Patent No.: US 11,153,794 B2
(45) Date of Patent: Oct. 19, 2021

(54) CELL SELECTION METHOD AND USER EQUIPMENT

(71) Applicant: MediaTek Singapore Pte. Ltd., Singapore (SG)

(72) Inventors: Hongwei Zhang, Beijing (CN); Xiaochi Zhao, Beijing (CN); Xiao Dang, Beijing (CN); Quanping Wang, Beijing (CN); Tsung-Ming Lee, Hsinchu (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 22 days.

(21) Appl. No.: 16/459,983

(22) Filed: Jul. 2, 2019

(65) Prior Publication Data

US 2020/0008116 A1    Jan. 2, 2020

(30) Foreign Application Priority Data

Jul. 2, 2018 (CN) .......................... 201810705840.6

(51) Int. Cl.
*H04W 36/00* (2009.01)
*H04W 48/20* (2009.01)
*H04W 48/10* (2009.01)

(52) U.S. Cl.
CPC . *H04W 36/00835* (2018.08); *H04W 36/0069* (2018.08); *H04W 36/0085* (2018.08); *H04W 48/10* (2013.01); *H04W 48/20* (2013.01); *H04W 36/0058* (2018.08)

(58) Field of Classification Search
CPC ............................................... H04W 36/00835
See application file for complete search history.

(56) References Cited

U.S. PATENT DOCUMENTS

| | | | |
|---|---|---|---|
| 10,004,018 | B2 | 6/2018 | Chou et al. |
| 10,117,150 | B2 | 10/2018 | Cui et al. |
| 10,299,179 | B2 | 5/2019 | Huang et al. |
| 2014/0045504 | A1 | 2/2014 | Jung et al. |
| 2014/0314128 | A1 | 10/2014 | Li |
| 2014/0334444 | A1 | 11/2014 | Sachs et al. |

(Continued)

FOREIGN PATENT DOCUMENTS

| | | |
|---|---|---|
| CN | 101873661 A | 10/2010 |
| CN | 102065495 A | 5/2011 |

(Continued)

OTHER PUBLICATIONS

Chinese language office action dated Aug. 5, 2020, issued in application No. TW 108123253.

(Continued)

*Primary Examiner* — John D Blanton (74) *Attorney, Agent, or Firm* — McClure, Qualey & Rodack, LLP (57) ABSTRACT

A cell selection method and user equipment (UE) are provided. The cell selection method is applied to the UE. The cell selection method includes the steps of obtaining a candidate cell group; selecting a first candidate cell subgroup from the candidate cell group according to the communication ability supported by each candidate cell of the candidate cell group; and selecting a camping cell of the UE from the first candidate cell sub-group.

16 Claims, 3 Drawing Sheets

(56) References Cited

U.S. PATENT DOCUMENTS

| | | | | |
|---|---|---|---|---|
| 2015/0296391 A1* | 10/2015 | Kotkar | ............... | H04L 65/4076 |
| | | | | 370/254 |
| 2015/0334769 A1 | 11/2015 | Kim et al. | | |
| 2016/0277968 A1* | 9/2016 | Ekemark | ............... | H04W 24/10 |
| 2017/0094571 A1* | 3/2017 | Yu | ........................ | H04W 36/08 |
| 2017/0111202 A1* | 4/2017 | Kim | .................... | H04L 27/0008 |
| 2017/0332284 A1* | 11/2017 | Nenner | ............. | H04W 36/0016 |
| 2018/0027460 A1* | 1/2018 | Zhang | ................... | H04W 36/20 |
| | | | | 455/437 |
| 2018/0192335 A1* | 7/2018 | Bontu | ................... | H04W 36/24 |
| 2019/0052582 A1* | 2/2019 | Gaal | ..................... | H04L 1/1835 |
| 2019/0268840 A1* | 8/2019 | Chen | ..................... | H04W 48/14 |
| 2020/0154325 A1* | 5/2020 | Jiang | ..................... | H04W 36/00 |
| 2020/0187073 A1* | 6/2020 | Ma | ........................ | H04W 36/30 |

FOREIGN PATENT DOCUMENTS

| | | | |
|---|---|---|---|
| CN | 102387508 | A | 3/2012 |
| CN | 103906147 | A | 7/2014 |
| CN | 104080133 | A | 10/2014 |
| CN | 105007606 | A | 10/2015 |
| CN | 106211268 | A | 12/2016 |
| CN | 106900023 | A | 6/2017 |
| CN | 107223350 | A | 9/2017 |
| EP | 2 775 758 | A1 | 9/2014 |

OTHER PUBLICATIONS

Chinese language office action dated Apr. 6, 2021, issued in application No. CN 201910549478.2.

* cited by examiner

CELL SELECTION METHOD AND USER EQUIPMENT

CROSS REFERENCE TO RELATED APPLICATIONS

This application claims priority of CN Provisional Patent Application No. 201810705840.6, filed on Jul. 2, 2018, the entirety of which is incorporated by reference herein.

BACKGROUND OF THE INVENTION

Field of the Invention

The invention generally relates to a cell selection technology, and more particularly, to the cell selection technology for selecting the camping cell according to the communication ability of the candidate cells.

Description of the Related Art

As mobile communication networks have developed in recent years, people have higher requirements for the data service provided through mobile terminals (user equipment) and there are more requirements on the throughput of a data service. Data services may comprise browsing the web, watching videos, online gaming, video calls, high-speed downloads, and so on.

With the development of mobile communication technologies, and particularly Long Term Evolution (LTE) technology (i.e. 4G technology), LTE-Advanced technology (i.e. 4G+ technology), and the 5G technology, mobile terminals can achieve faster uplink data and downlink data throughput. Therefore, user experience may be improved. In addition, some older communication technologies (e.g. 2G, 3G communication technologies) may still be used, and may still coexist with the new communication technologies (e.g. 4G, 4G+, 5G) for a while.

However, current standards do not specify that the mobile terminal can actively query the communication ability of a network. Therefore, before the mobile terminal camps on a cell, the mobile terminal does not know whether the cell can support the communication ability of the mobile terminal to allow the mobile terminal to reach high performance (i.e. the mobile terminal can know whether the communication ability of the cell matches its communication ability). As a result, the performance (e.g. the throughput of the data service) of the mobile terminal may be affected. In addition, because different network operators may have different network resources, e.g. frequency band, bandwidth, and so on, in a real network environment, even if different cells can support the same communication technology, the network resources (e.g. bandwidth) provided through the cells may be different. The difference may also affect the throughput of the mobile terminal. In addition, in the real network environment, there are some problems, such as the uneven coverage of the network signal in the network deployment, the interference between the cells, which may also affect the throughput of the data service on the mobile terminal.

In current communication standards, in camping cell selection, the mobile terminal may select a camping cell mainly according to the signal strengths of the cells. However, the mobile terminal does not further concern the factors, such as the communication abilities of the cells, the wireless communication resource which can be provided, the quality of the signal and the interference, for the data service. Therefore, in a real network environment, sometimes the signal strength of a cell is good, but the throughput of the data service is bad. Therefore, the experience of the user of a mobile terminal may be affected. Therefore, how to increase the throughput of the data service in a real network environment to improve the experience of the user of the mobile terminal is an issue which needs to be solved.

BRIEF SUMMARY OF THE INVENTION

A cell selection method and user equipment (UE) are provided to overcome the problems mentioned above.

An embodiment of the invention provides a cell selection method. The cell selection method is applied to user equipment (UE). The cell selection method comprises the steps of obtaining a candidate cell group; selecting a first candidate cell sub-group from the candidate cell group according to the communication ability supported by each candidate cell of the candidate cell group; and selecting a camping cell of the UE from the first candidate cell sub-group.

In some embodiments of the invention, the cell selection method further comprises the steps of if the first candidate cell sub-group comprises at least two candidate cells, selecting a second candidate cell sub-group from the first candidate cell sub-group according to network resource of each candidate cell of the first candidate cell sub-group; and selecting the camping cell of the UE from the second candidate cell sub-group.

In some embodiments of the invention, the cell selection method further comprises the step of if the first candidate cell sub-group comprises only one candidate cell, selecting the candidate cell of the first candidate cell sub-group to be the camping cell of the UE.

In some embodiments of the invention, the cell selection method further comprises the step of if the second candidate cell sub-group comprises at least two candidate cells, selecting the camping cell of the UE according to the signal environment parameters of each candidate cell of the second candidate cell sub-group.

In some embodiments of the invention, the cell selection method further comprises the step of if the second candidate cell sub-group comprises only one candidate cell, selecting the candidate cell of the second candidate cell sub-group to be the camping cell of the UE.

In some embodiments of the invention, the cell selection method further comprises the step of obtaining information about the communication ability supported by each candidate cell of the candidate cell group according to messages broadcast by the candidate cells and information stored by the UE.

In some embodiments of the invention, the communication abilities supported by the candidate cell comprise whether the candidate cell supports the 5G communication technology, whether the candidate cell supports the carrier aggregation (CA) technology, and whether the candidate cell supports the 256 Quadrature Amplitude Modulation (QAM) encoding technology, but the invention should not be limited thereto, wherein different communication abilities have different priorities. In some embodiments of the invention, the network resources of the candidate cell comprises the bandwidth and the length of the time slot, but the invention should not be limited thereto, wherein different network resources have different priorities. In some embodiments of the invention, the signal environment parameters of the candidate cell comprise the signal strength of the candidate cell and Signal-to-noise ratio (SNR), but the invention should not be limited thereto, wherein different signal environment parameters have different priorities.

An embodiment of the invention provides user equipment (UE). The UE comprises a processor and a memory device. The processor obtains a candidate cell group and selects a first candidate cell sub-group from the candidate cell group according to the communication ability supported by each candidate cell of the candidate cell group. The memory device is coupled to the processor. The processor selects a camping cell of the UE from the first candidate cell sub-group.

The methods of the UE camping on the camping cell comprise cell selection, cell reselection and cell handover.

Other aspects and features of the invention will become apparent to those with ordinary skill in the art upon review of the following descriptions of specific embodiments of cell selection methods and UE.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
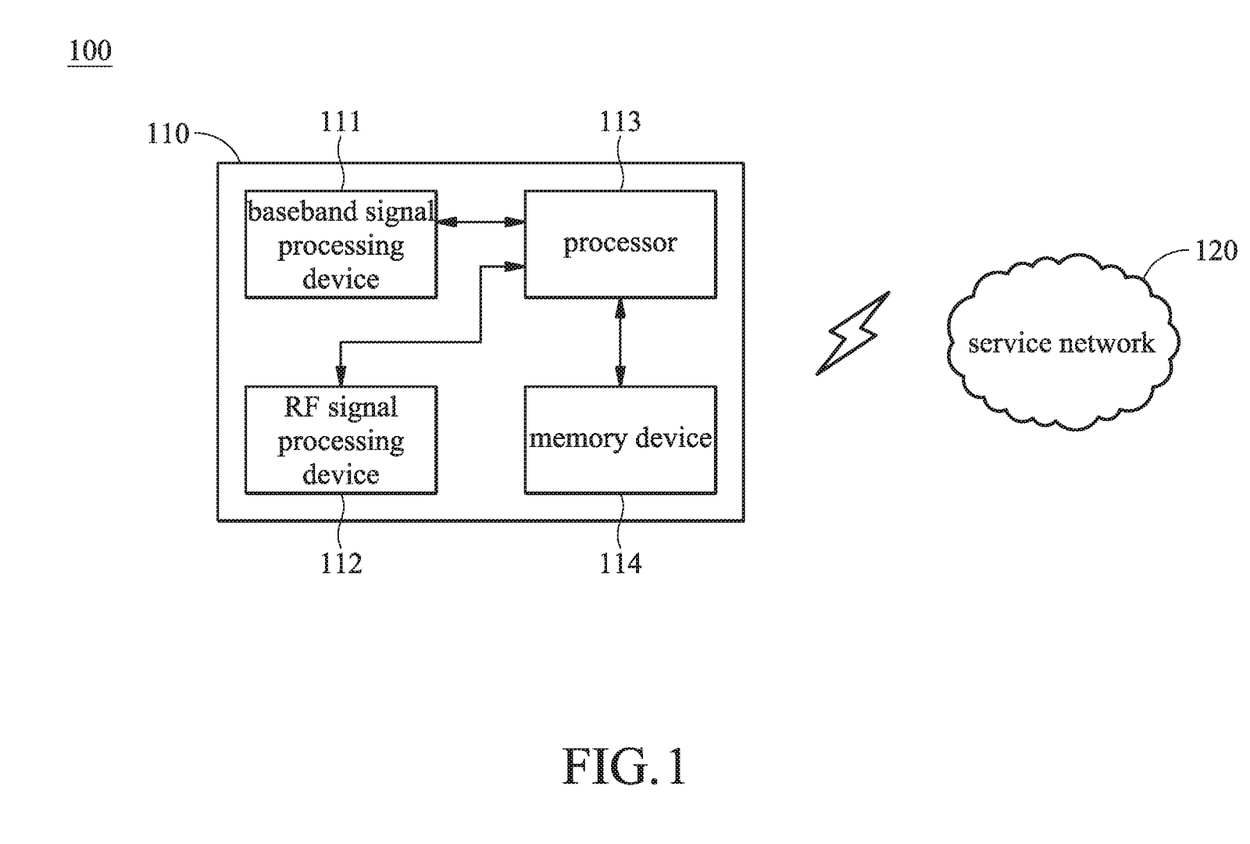
FIG. 1 is a block diagram of a mobile communications system according to an embodiment of the invention.

FIG. 1 is a block diagram of a mobile communications system 100 according to an embodiment of the invention. The system 100 comprises User Equipment (UE) 110 and a service network 120. The UE 110 may be a mobile communications device, such as a cellular phone, a smartphone modem processor, a data card, a laptop stick, a mobile hotspot, a USB modem, a tablet, etc.

The UE 110 may comprise at least a baseband signal processing device 111, a radio frequency (RF) signal processing device 112, a processor 113, a memory device 114, and an antenna module comprising at least one antenna. Note that, in order to clarify the concept of the invention, FIG. 1 presents a simplified block diagram in which only the elements relevant to the invention are shown. However, the invention should not be limited to what is shown in FIG. 1.

The RF signal processing device 112 may receive RF signals via the antenna and process the received RF signals to convert the received RF signals to baseband signals to be processed by the baseband signal processing device 111, or receive baseband signals from the baseband signal processing device 111 and convert the received baseband signals to RF signals to be transmitted to a peer communications apparatus. The RF signal processing device 112 may comprise a plurality of hardware elements to perform radio frequency conversion. For example, the RF signal processing device 112 may comprise a power amplifier, a mixer, etc.

The baseband signal processing device 111 may further process the baseband signals to obtain information or data transmitted by the peer communications apparatus. The baseband signal processing device 111 may also comprise a plurality of hardware elements to perform baseband signal processing. The baseband signal processing may comprise analog-to-digital conversion (ADC)/digital-to-analog conversion (DAC), gain adjustment, modulation/demodulation, encoding/decoding, and so on.

The processor 113 may control the operations of the baseband signal processing device 111 and the RF signal processing device 112. According to an embodiment of the invention, the processor 113 may also be arranged to execute the program codes of the software module(s) of the corresponding baseband signal processing device 111 and/or the RF signal processing device 112. The program codes accompanied by specific data in a data structure may also be referred to as a processor logic unit or a stack instance when being executed. Therefore, the processor 113 may be regarded as being comprised of a plurality of processor logic units, each for executing one or more specific functions or tasks of the corresponding software module(s).

The memory device 114 may store the software and firmware program codes, system data, user data, etc. of the UE 110. The memory device 114 may be a volatile memory such as a Random Access Memory (RAM); a non-volatile memory such as a flash memory or Read-Only Memory (ROM); a hard disk; or any combination thereof.

According to an embodiment of the invention, the RF signal processing device 112 and the baseband signal processing device 111 may collectively be regarded as a radio module capable of communicating with a wireless network to provide wireless communications services in compliance with a predetermined Radio Access Technology (RAT). Note that, in some embodiments of the invention, the UE 120 may be extended further to comprise more than one antenna and/or more than one radio module, and the invention should not be limited to what is shown in FIG. 1.

In addition, in some embodiments of the invention, the processor 113 may be configured inside of the baseband signal processing device 111, or the UE 110 may comprise another processor configured inside of the baseband signal processing device 111. Thus the invention should not be limited to the architecture shown in FIG. 1.

According to embodiments of the invention, the service network 120 may be a Global System for Mobile Communications (GSM), a GSM Edge Radio Access Network (GERAN), a Universal Terrestrial Radio Access Network (UTRAN), or an Evolved UTRAN (E-UTRAN), or a 5G new radio (NR) network, but the invention should not be limited thereto.

Note that, the "cell selection" illustrated in the embodiments of the invention can be applied to different applications, such as, cell selection, cell reselection and cell handover. In addition, although in general, the operation of the handover is controlled by the network through the handover command, in real application, the handover is triggered through the measurement report of the UE. Therefore, in the cell selection method provided in the embodiments of the invention, the UE 110 still can achieve the purpose of selecting the ideal camping cell by selecting the trigger timing of the handover to the target cell or adjusting the timing of sending the measurement report.

In an embodiment of the invention, when the UE 110 needs to select a cell to camp on, the UE 110 may obtain a candidate cell group S1 according to the neighbor cell information configured by the service network 120 and the neighbor cell information detected by the UE 110. The candidate cell group S1 may comprise a plurality of candidate cells to provide to the UE 110 to select.

After the UE 110 has obtained the candidate cell group S1, the processor 113 of the UE 110 may determine the communication ability supported by each candidate cell of the candidate cell group S1. According to an embodiment of the invention, the processor 113 of the UE 110 may obtain information about the communication ability supported by each candidate cell of the candidate cell group S1 according to the messages broadcast by the candidate cells and the information learned by the UE 110. According to the embodiments of the invention, the messages broadcast by the candidate cells may comprise the information loaded on the master information block (MIB) and the system information block (SIB), but the invention should not be limited thereto. According to the embodiments of the invention, the information learned by the UE 110 may comprise information about the communication ability of the cell which the UE 110 camped on before, e.g. the frequency of the cell, the identifier (ID) of the cell, and so on. The information learned by the UE 110 may be stored in the memory device 114. When the candidate cells comprise the cell which the UE 110 camped on before, the UE 110 may directly obtain information about the communication ability of the cell from the memory device 114.

According to an embodiment of the invention, the communication abilities supported by the candidate cell may comprise whether the candidate cell supports the 5G communication technology (or 5G new radio (NR) technology), whether the candidate cell supports the 4G communication technology (or LTE technology), whether the candidate cell supports the carrier aggregation (CA) technology, and whether the candidate cell supports the 256 Quadrature Amplitude Modulation (QAM) encoding technology, but the invention should not be limited thereto. Different communication abilities may have different priorities. The UE 110 may sort the candidate cells of the candidate cell group S1 by the priorities of different communication abilities. (e.g. according to following orders, support 5G communication technology and 5G NR CA technology>only support 5G communication technology>support 4G communication technology and 4G LTE CA technology>support 4G communication technology and 256QAM encoding technology>merely support 4G communication technology, but the invention should not be limited thereto). After the UE 110 sorted the candidate cells of the candidate cell group S1, the UE 110 may select a first candidate cell sub-group S2 from the candidate cell group S1 according to the sort result. That is to say, the UE 110 may select a first candidate cell sub-group S2 from the candidate cell group S1 according the communication ability supported by each candidate cell of the candidate cell group S1 and the communication ability supported by the UE 110. For example, if the cell A and cell B are 4G cells (LTE cells), and the difference between the cell A and cell B is that cell A supports CA technology, but cell B does not support CA technology, the priority of the cell A will be higher than the priority of cell B. The UE 110 may select the cell A to be the camping cell first. However, in the UE 110 does not support the CA technology itself, the UE 110 may concern other abilities of the cells (e.g. the network resources provided by the candidate cells, and the signal environment parameters of the candidate cells).

After the UE 110 selected a first candidate cell sub-group S2 from the candidate cell group S1, if the first candidate cell sub-group S2 merely comprises a candidate cell, the UE 110 may select the candidate cell to be the camping cell, and start to try to camp on the candidate cell. If the first candidate cell sub-group S2 comprises at least two candidate cells, the UE 110 select a second candidate cell sub-group S3 from the first candidate cell sub-group S2 according to the network resource of each candidate cell of the first candidate cell sub-group S2. For example, if the candidate cell which supports 5G technology has the highest priority and the UE 110 support the 5G technology, the UE 110 may select the candidate cell which supports 5G technology from the candidate cell group S1 to be the candidate cell in the first candidate cell sub-group S2. If there is only one candidate cell which supports 5G technology in the candidate cell group S1 (i.e. the first candidate cell sub-group S2 only comprise one candidate cell), the UE 110 may select the candidate cell to be the camping cell, and start to try to camp on the candidate cell. If there are at least two candidate cells which support 5G technology in the candidate cell group S1, the UE 110 may select the candidate cells which support 5G technology from the candidate cell group S1 to be the candidate cells in the first candidate cell sub-group S2 and select a second candidate cell sub-group S3 from the first candidate cell sub-group S2 according to the network resource of each candidate cell of the first candidate cell sub-group S2.

According to an embodiment of the invention, the network resources of the candidate cell may comprise the bandwidth and the length of the time slot, but the invention should not be limited thereto. Different network resources may have different priorities. The UE 110 may sort all of the candidate cells of the first candidate cell sub-group S2 according to the different priorities of different network resources. For example, if the priority of the bandwidth is higher than the priority of the length of the time slot, when the bandwidth of the candidate cell C of the first candidate cell sub-group S2 is 20 MHz and the bandwidth of the candidate cell D of the first candidate cell sub-group S2 is 10 MHz, the candidate cell C may have higher priority than the candidate cell D.

The UE 110 may select a second candidate cell sub-group S3 from the first candidate cell sub-group S2 according to the sort result. If the second candidate cell sub-group S3 only comprises one candidate cell, the UE 110 may select the candidate cell of the second candidate cell sub-group S3 to be the camping cell, and start to try to camp on the cell. If the second candidate cell sub-group S3 comprises at least two candidate cells, the UE 110 may select a camping cell from the second candidate cell sub-group S3 according to the signal environment parameters of each candidate cell of the second candidate cell sub-group S3, and start to try to camp on the selected candidate cell. For example, if the candidate cell whose bandwidth is 20 MHz has the highest priority, the UE 110 may select the candidate cell whose bandwidth is 20 MHz from the first candidate cell sub-group S2 to be the candidate cell of the second candidate cell sub-group S3. If there is only one candidate cell whose bandwidth is 20 MHz in the first candidate cell sub-group S2 (i.e. the second candidate cell sub-group S3 only comprises one candidate cell), the UE 110 may select the candidate cell to be the camping cell and start to try to camp on the cell. If there are at least two candidate cells whose bandwidths are 20 MHz, the UE 110 may select the candidate cells whose bandwidths are 20 MHz from the first candidate cell sub-group S2 to be the candidate cells of the second candidate cell sub-group S3, and the UE 110 may select a camping cell from the second candidate cell sub-group S3 according to the signal environment parameters of each candidate cell of the second candidate cell sub-group S3, and start to try to camp on the selected candidate cell.

According to an embodiment of the invention, the signal environment parameters of the candidate cell may comprise the signal strength of the candidate cell (e.g. Reference Symbol Received Power (RSRP) and Received Signal Strength Indication (RSSI)) and Signal-to-noise ratio (SNR), but the invention should not be limited thereto. Different signal environment parameters may have different priorities. The UE 110 may sort all candidate cells of the second candidate cell sub-group S3 according to the priorities of different signal environment parameters. For example, if the priority of the signal strength is higher than the priority of the SNR, the UE 110 may select the candidate cell which has the highest signal strength from the second candidate cell sub-group S3 to be the camping cell and start to try to camp on the selected candidate cell.

Figure 2A:
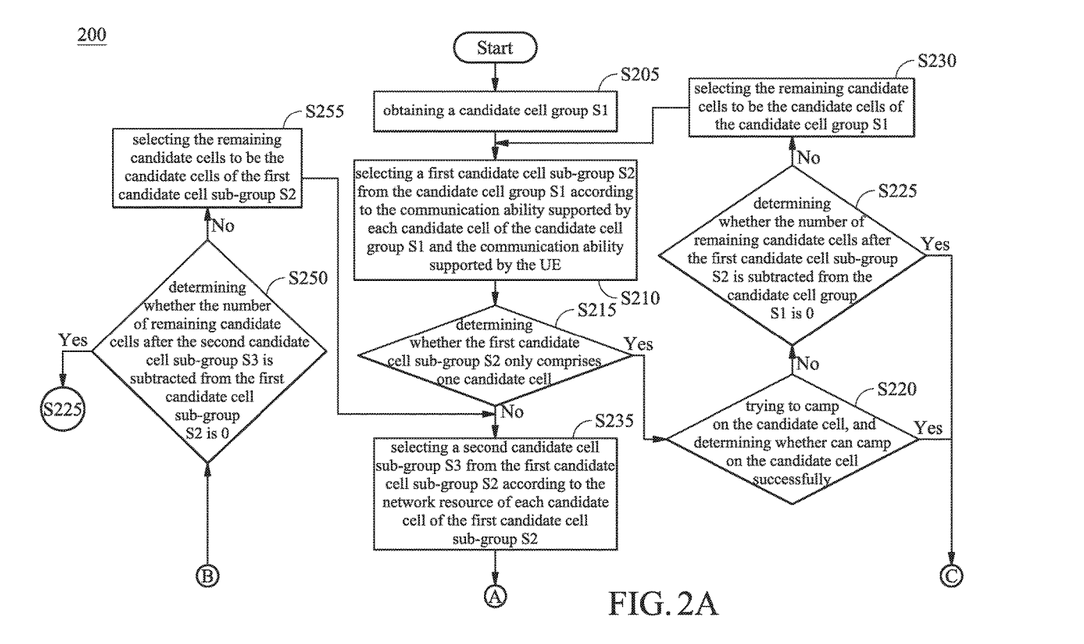
FIG. 2A-2B is a flow chart illustrating a cell selection method according to an embodiment of the invention.
Figure 2B:
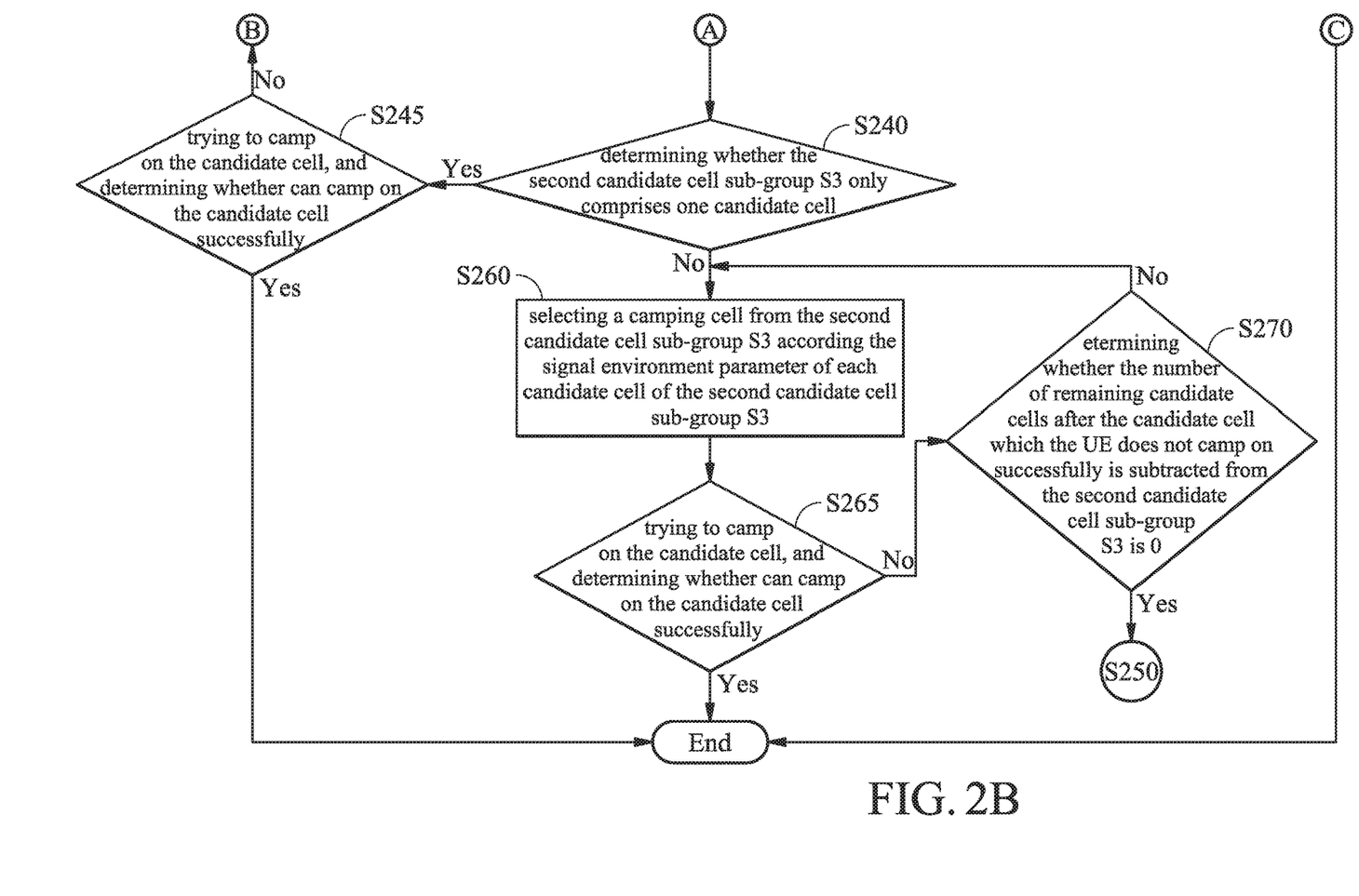

FIG. 2A-2B is a flow chart 200 illustrating a cell selection method according to an embodiment of the invention. The cell selection method can be applied to the communication system 100. As shown in FIG. 2A-2B, in step S205, the UE 110 obtains a candidate cell group S1. In step S205 the UE 110 selects a first candidate cell sub-group S2 from the candidate cell group S1 according to the communication ability supported by each candidate cell of the candidate cell group S1 and the communication ability supported by the UE 110. In step S215, the UE 110 determines whether the first candidate cell sub-group S2 only comprises one candidate cell. If the first candidate cell sub-group S2 only comprises one candidate cell, step S220 is performed. In step S220, the UE 110 tries to camp on the candidate cell, and determines whether can camp on the candidate cell successfully. If the UE cannot camp on the candidate cell successfully, step S225 is performed. In step S225, the UE 110 determines whether the number of remaining candidate cells after the first candidate cell sub-group S2 is subtracted from the candidate cell group S1 is 0 (i.e. S1'=S1−S2=Φ (empty set)). If the number of remaining candidate cells is not 0 (i.e. S1'≠0) step S230 is performed. In step S230, the UE 110 may select the remaining candidate cells to be the candidate cells of the candidate cell group S1 (i.e. S1 is set to S1').

If the first candidate cell sub-group S2 comprises at least two candidate cells, step S235 is performed. In step S235, the UE 110 selects a second candidate cell sub-group S3 from the first candidate cell sub-group S2 according to the network resource of each candidate cell of the first candidate cell sub-group S2. In step S240, the UE 110 determines whether the second candidate cell sub-group S3 only comprises one candidate cell. If the second candidate cell sub-group S3 only comprises one candidate cell, step S245 is performed. In step S245, the UE 110 tries to camp on the candidate cell, and determines whether can camp on the candidate cell successfully. If the UE cannot camp on the candidate cell successfully, step S250 is performed. In step S250, the UE 110 determines whether the number of remaining candidate cells after the second candidate cell sub-group S3 is subtracted from the first candidate cell sub-group S2 is 0 (i.e. S2'=S2−S3=Φ (empty set)). If the number of remaining candidate cells is not 0 (i.e. S2'≠0), step S255 is performed. In step S255, the UE 110 may select the remaining candidate cells to be the candidate cells of the first candidate cell sub-group S2 (i.e. S2 is set to S2'), and the method returns to step S235. If the number of remaining candidate cells is 0 (i.e. S2'=0), the method returns to step S225.

If the second candidate cell sub-group S3 comprises at least two candidate cells, step S260 is performed. In step S260, the UE 110 selects a camping cell from the second candidate cell sub-group S3 according the signal environment parameter of each candidate cell of the second candidate cell sub-group S3. In step S265, the UE 110 tries to camp on the candidate cell, and determines whether can camp on the candidate cell successfully.

If the UE cannot camp on the candidate cell successfully, step S270 is performed. In step S270, the UE 110 determines whether the number of remaining candidate cells after the candidate cell which the UE 110 does not camp on successfully is subtracted from the second candidate cell sub-group S3 is 0. If the number of remaining candidate cells after the candidate cell which the UE 110 does not camp on successfully is subtracted from the second candidate cell sub-group S3 is not 0, the method returns to step S260. If number of remaining candidate cells after the candidate cell which the UE 110 does not camp on successfully is subtracted from the second candidate cell sub-group S3 is 0, the method returns to step S250.

In some embodiments of the invention, in step S210, the UE 110 may obtain information about the communication ability supported by each candidate cell of the candidate cell group S1 according to the messages broadcast by the candidate cells and the information stored (learned) by the UE 110.

In some embodiments of the invention, the communication abilities supported by the candidate cell may comprise whether the candidate cell supports the 5G communication technology (or 5G new radio (NR) technology), whether the candidate cell supports the carrier aggregation (CA) technology, and whether the candidate cell supports the 256 Quadrature Amplitude Modulation (QAM) encoding technology, but the invention should not be limited thereto. Different communication abilities may have different priorities. In some embodiments of the invention, the network resources of the candidate cell may comprise the bandwidth and the length of the time slot, but the invention should not be limited thereto. Different network resources may have different priorities. In some embodiments of the invention, the signal environment parameters of the candidate cell may comprise the signal strength of the candidate cell and Signal-to-noise ratio (SNR), but the invention should not be limited thereto. Different signal environment parameters may have different priorities.

Accordingly, in the cell selection method provided in the embodiments of the invention, the UE 110 can concern and analyze the communication ability supported by the candidate cell, the network resource provided by the candidate cell, and the signal environment parameters of the candidate cell to select the most appropriate camping cell. Therefore, comparing to current cell selection method (i.e. select the camping cell only according to the signal strengths of the cells), in the cell selection method provided in the embodiments of the invention, the UE 110 can further concern the real network environment to increase the throughput of the data service.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer software product may comprise packaging materials.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A cell selection method, applied to a user equipment (UE), comprising:
 obtaining a candidate cell group;
 selecting a first candidate cell sub-group from the candidate cell group according to communication ability supported by each candidate cell of the candidate cell group and communication ability supported by the UE;
 if the first candidate cell sub-group comprises at least two candidate cells, selecting a second candidate cell sub-group from the first candidate cell sub-group according to network resource of each candidate cell of the first candidate cell sub-group; and
 if the second candidate cell sub-group comprises at least two candidate cells, selecting the camping cell of the UE according to signal environment parameters of each candidate cell of the second candidate cell sub-group from the second candidate cell sub-group, wherein priority of the communication ability is higher than priority of the network resource, and the priority of the network resource is higher than priority of the signal environment parameters.

2. The cell selection method of claim 1, further comprising:
 if the first candidate cell sub-group comprises only one candidate cell, selecting the candidate cell of the first candidate cell sub-group to be the camping cell of the UE.

3. The cell selection method of claim 1, further comprising:
 if the second candidate cell sub-group comprises only one candidate cell, selecting the candidate cell of the second candidate cell sub-group to be the camping cell of the UE.

4. The cell selection method of claim 1, further comprising:
 obtaining information about the communication ability supported by each candidate cell of the candidate cell group according to messages broadcast by the candidate cells and information stored by the UE.

5. The cell selection method of claim 1, wherein the communication abilities supported by the candidate cell comprise whether the candidate cell supports the 5G communication technology, whether the candidate cell supports the carrier aggregation (CA) technology, and whether the candidate cell supports the 256 Quadrature Amplitude Modulation (QAM) encoding technology, wherein different communication abilities have different priorities.

6. The cell selection method of claim 1, wherein the network resources of the candidate cell comprises bandwidth and length of time slot, wherein different network resources have different priorities.

7. The cell selection method of claim 1, wherein the signal environment parameters of the candidate cell comprise signal strength of the candidate cell and Signal-to-noise ratio (SNR), wherein different signal environment parameters have different priorities.

8. The cell selection method of claim 1, wherein the methods of the UE camping on the camping cell comprise cell selection, cell reselection and cell handover.

9. User equipment (UE), comprising:
 a processor, obtaining a candidate cell group and selecting a first candidate cell sub-group from the candidate cell group according to communication ability supported by each candidate cell of the candidate cell group and communication ability supported by the UE; and
 a memory device, coupled to the processor;
 wherein if the first candidate cell sub-group comprises at least two candidate cells, the processor selects a second candidate cell sub-group from the first candidate cell sub-group according to network resource of each candidate cell of the first candidate cell sub-group, and if the second candidate cell sub-group comprises at least two candidate cells, the processor selects the camping cell of the UE according to signal environment parameters of each candidate cell of the second candidate cell sub-group from the second candidate cell sub-group, wherein priority of the communication ability is higher than priority of the network resource, and the priority of the network resource is higher than priority of the signal environment parameters.

10. The UE of claim 9, wherein if the first candidate cell sub-group comprises only one candidate cell, the processor selects the candidate cell of the first candidate cell sub-group to be the camping cell of the UE.

11. The UE of claim 9, wherein if the second candidate cell sub-group comprises only one candidate cell, the processor selects the candidate cell of the second candidate cell sub-group to be the camping cell of the UE.

12. The UE of claim 9, wherein the processor obtains information about the communication ability supported by each candidate cell of the candidate cell group according to messages broadcast by the candidate cells and information stored by the UE.

13. The UE of claim 9, wherein the communication abilities supported by the candidate cell comprise whether the candidate cell supports the 5G communication technology, whether the candidate cell supports the carrier aggregation (CA) technology, and whether the candidate cell supports the 256 Quadrature Amplitude Modulation (QAM) encoding technology, wherein different communication abilities have different priorities.

14. The UE of claim 9, wherein the network resources of the candidate cell comprises bandwidth and length of time slot, wherein different network resources have different priorities.

15. The UE of claim 9, wherein the signal environment parameters of the candidate cell comprise signal strength of the candidate cell and Signal-to-noise ratio (SNR), wherein different signal environment parameters have different priorities.

16. The UE of claim 9, wherein the methods of the UE camping on the camping cell comprise cell selection, cell reselection and cell handover.

* * * * *